United States Patent [19]

Sugimoto

[11] Patent Number: 5,027,289
[45] Date of Patent: Jun. 25, 1991

[54] METHOD AND DEVICE FOR CONTROLLING A PLOTTER

[75] Inventor: Junichi Sugimoto, Iwatsuki, Japan

[73] Assignee: Fuji Xerox Co., Ltd., Tokyo, Japan

[21] Appl. No.: 294,171

[22] Filed: Jan. 6, 1989

[30] Foreign Application Priority Data

May 11, 1988 [JP] Japan .............................. 63-114479

[51] Int. Cl.$^5$ ................................................ G11B 5/00
[52] U.S. Cl. ................................. 364/520; 346/153.1
[58] Field of Search .............................. 364/519, 520; 346/153.1, 160, 160.1, 157; 371/5.1, 5.3, 19, 37.1

[56] References Cited

U.S. PATENT DOCUMENTS

| 4,149,190 | 4/1979 | Wessler et al. ...................... 358/174 |
| 4,233,612 | 11/1980 | Hirayama et al. .................. 346/160 |
| 4,740,802 | 4/1988 | Stuckey-Kauffman et al. ... 346/152 |
| 4,807,142 | 2/1989 | Agarwal .......................... 364/521 X |
| 4,816,925 | 3/1989 | Hayashi .......................... 364/521 X |

*Primary Examiner*—Heather R. Herndon
*Attorney, Agent, or Firm*—Spensley Horn Jubas & Lubitz

[57] ABSTRACT

A control method of an image recording apparatus, and a control device for carrying out the control method. When output control data is incorrect for an amount of input image data, the incorrect output control data is made invalid, and output control data as is preset as default values is transferred to the image recording apparatus.

6 Claims, 2 Drawing Sheets

METHOD AND DEVICE FOR CONTROLLING A PLOTTER

BACKGROUND OF THE INVENTION

The present invention generally relates to a control method of an image recording apparatus for visually outputting an image, and a control device for carrying out the control method. More particularly, the present invention relates to a control method for causing an image recording apparatus to output graphic data as generated by a computer, e.g., a host computer, and a control device for carrying out the control method.

The image recording apparatus, which visually outputs an image of the graphic data (vector data) as is generated by a computer generating and supplying graphic data, e.g., a host computer, comes in two varieties, an electrostatic plotter and a called Xerography plotter.

The electrostatic plotter directly forms an electrostatic latent image on an electrostatic recording paper by a recording head of the multi-needle electrode type, and applies a subsequent developing process to the latent image, and finally produces an image in a visual manner. The Xerography plotter forms an electrostatic latent image on a photosensitive drum, and transforms the latent image into a visible image, and finally transfers it on normal paper.

A conventional control device for controlling the image recording apparatus controls the outputting operation of the image recording apparatus according to the data for controlling the output operation of the image recording apparatus as it is transferred from a host computer (the data will be referred to as output control data). In the case that the output control data transferred from a host computer is, for example, data about the output-request size of the paper and the output-request number of the paper as an image recording medium, the control device controls the outputting operation of the image recording apparatus according to the output control data of the output-request size and the output-request number of the paper.

There often occurs a case that the output control data is incorrect for an amount of image data transferred from a host computer, in other words, the image data amount from the host computer is not within a range of a predetermined amount of image data which is uniquely determined for the output-request size, or more exactly the image data amount from the host computer exceeds the range of the predetermined image data amount which is uniquely determined for the output-request size. Even in such a case, the conventional control device controls the outputting operation of the image recording apparatus according to the instruction by the output control data from the host computer. Consequently, the image recording apparatus outputs an image (visible output) with the output-request number of the paper according to the instruction based on the incorrect output control data, or the data of the incorrect output-request size. The problem is a negligible matter when a sheet of paper is the output-request number of paper, which is based on the instruction by the incorrect output-request size data. When the output-request number based on the instruction by the incorrect output-request size is two or more, a number of the incorrect visible outputs of image are output from the image recording apparatus. This results in a waste of paper, and this is to urgently be solved.

SUMMARY OF THE INVENTION

Accordingly, an object of the present invention is to provide a control method of an image recording apparatus in which even when the output control data is incorrect for an amount of input image data, the image recording apparatus does not uselessly use papers, and a control device for carrying out the control method.

To achieve the above object, in a control method of an image recording apparatus, and a control device for carrying out the control method, when input output control data is incorrect for an amount of input image data, the incorrect output control data is made invalid, and the outputting operation of the image recording apparatus is controlled on the basis of the output control data as is preset as default values.

With such a technical idea, a control method of an image recording apparatus, and a control device for carrying out the control method can prohibit the image recording apparatus from outputting a number of the incorrect visual images.

Other objects, features and advantages of the present invention will be apparent when carefully reading the detailed description in connection with the accompanying drawings.

DETAILED DESCRIPTION OF THE PREFERRED EMBODIMENT

Embodiments of a control method of an image recording apparatus, and a control device for carrying out the control method, which are according to the present invention, will be described in detail.

Figure 2:
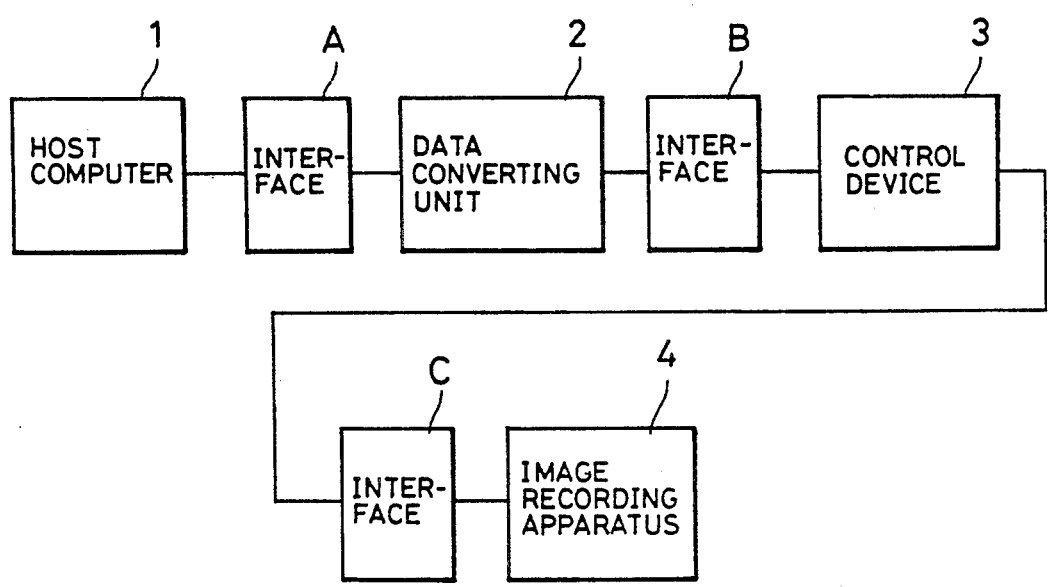
FIG. 2 is a block diagram showing an image recording system incorporating a control device according to the present invention.

FIG. 2 is a block diagram showing an image recording system using the control method and the control device according to the present invention.

Graphic data (vector data) as is generated and supplied by a computer, e.g., a host computer 1, is converted into raster image data by means of a data converting unit 2. The image data thus converted is sequentially transferred to image recording apparatus 4, such as an electrostatic plotter, through a control device 3 according to the present invention of the present patent application. Finally, the control device causes the image recording apparatus 4 to visually output an image (visible output). In FIG. 2, characters A, B and C represent physical I/O interfaces.

The control device 3 comprises an input control unit 5, a counter 6, an image memory unit 8, a data memory unit 9, and an output control unit 10. The input control unit 5 controls the destination of the image data converted by the data converting unit 2, which is contained in the data transferred from the host computer 1, and the destination of the output control data transferred from the host computer 1, viz., the data about output-request size and the output-request number of paper. The counter 6 counts and transfers a value representing an amount of image data transferred from the input control unit 5, and transfers the counted image data. The image memory unit 8 temporarily stores the image data transferred from the counter 6. The data memory unit 9 stores a range of the value representing a predetermined amount of image data which is uniquely determined by the output-request size data of the output control data, and the output control data of the output-request size and the output-request number of paper, which are preset as default values. The output control unit 10 receives the output control data of the output-request size as transferred from the input control unit 5, and reads out from the data memory unit 9, the range of the value representing the predetermined image data amount as is uniquely determined for the output-request size. The output control unit 10 then compares the value of the image data amount counted by the counter 6 with the range of the value, which is read out of the data memory unit 9, and representative of the predetermined image data amount as is uniquely determined for the output-request size. Finally, on the basis of the comparison result, the output control unit 10 makes a decision as to whether the output control data from the host computer is transferred to the image recording apparatus or the output control data as the preset default values is transferred to the same. The input control unit 5 and the output control unit 10 are each made up of a CPU (central processing unit) and a peripheral circuitry containing a main memory as a major component.

The operation of the control device 3 thus arranged and its detailed arrangement as well will be described.

Figure 3:
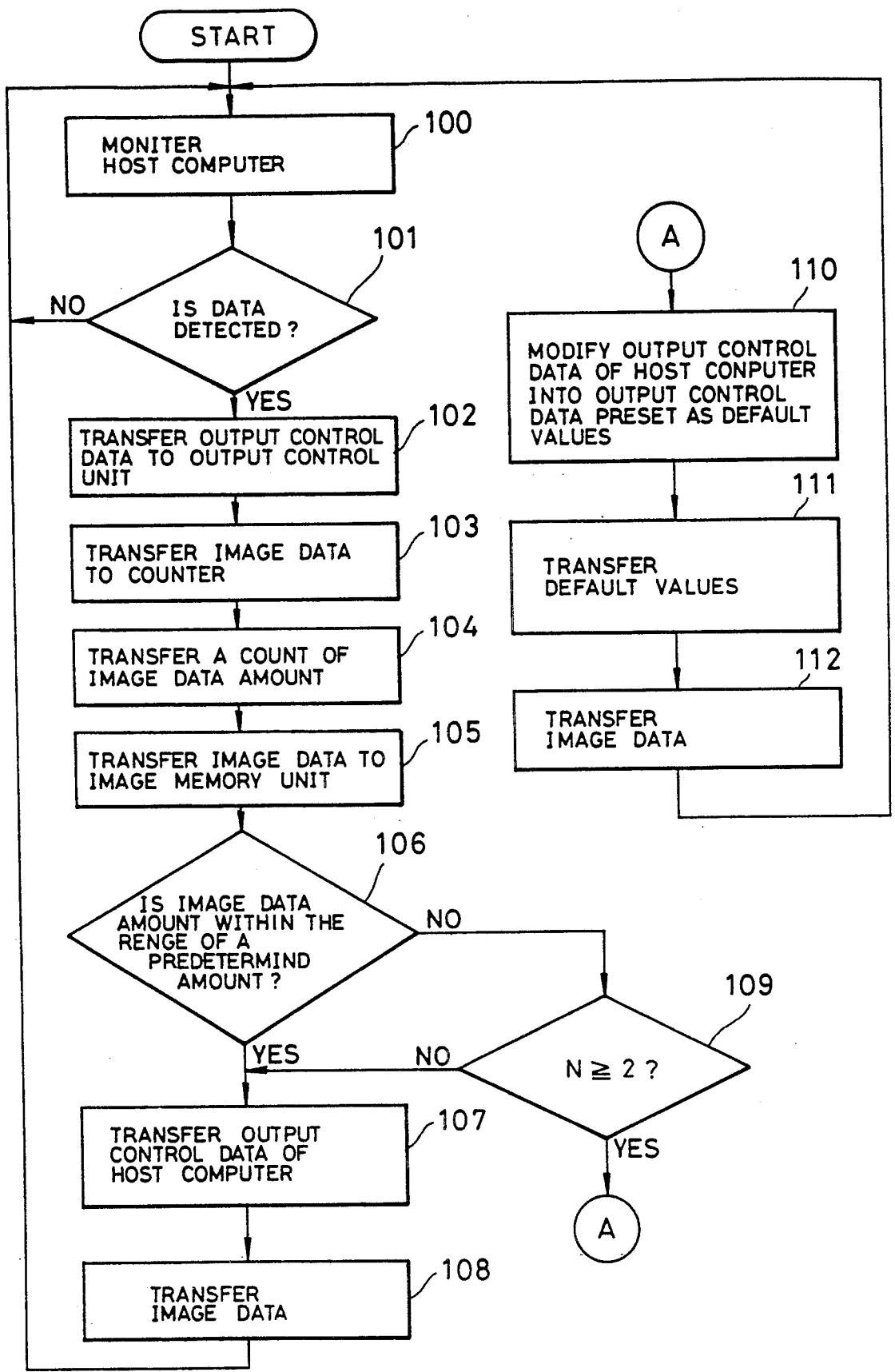
FIG. 3 is a flowchart showing a sequence of control processing steps, which is performed by a control device according to the present invention.

FIG. 3 is a flowchart showing a sequence of control processing steps by the control device 3.

Figure 1:
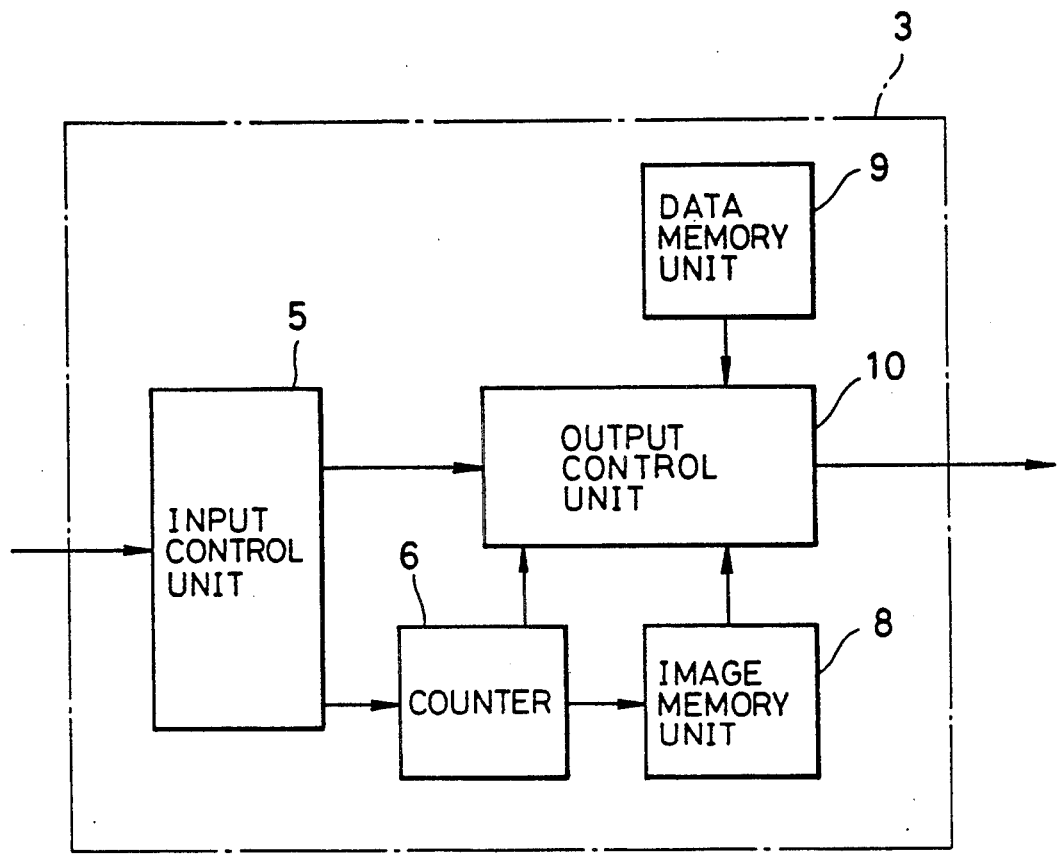
FIG. 1 is a block diagram showing a control device according to the present invention.

The input control unit 5 shown in FIG. 1 constantly monitors the host computer 1 (FIG. 2) (Step 100). When detecting the data from the host computer 1 (Step 101), it transfers to the output control unit 10, the data of the output-request size and the output-request number of paper, which are the output control data of the image recording apparatus contained in the input data (Step 102). The input control unit 5 also transfers to the counter 6, the image data as the raster image data converted by the data converting unit 2 (Step 103). The counter 6 counts a value of an amount of the transferred image data, and transfers the value to the output control unit 10 (Step 104), and also transfers the computed image data to the image memory unit 8 (Step 105).

The output control unit 10 reads out from the data memory unit 9, a value indicative of the range of the image data amount as uniquely determined for the output-request size of the output control data coming from the host computer via the input control unit 5, and compares the range of the value indicating the predetermined image data amount as is read out, with the value of the image data amount from the counter 6. On the basis of the comparison result, the output control unit makes a decision as to whether or not the value of the image data amount transferred from the host computer falls within the range of the value indicative of the predetermined image data amount (Step 106). If it decides that the value of the image data amount transferred from the host computer falls within the range of the value indicative of the predetermined image data amount, it transfers to the image recording apparatus 4, the data of the output-request size and the output-request number of paper, which is the output control data of the image recording apparatus 4 coming from the host computer 1 (Step 107). Subsequently, it reads out the image data from the image memory unit 8, and transfers it to the image recording apparatus 4 (Step 108).

After completion of the sequence of the above processing steps, the control device 3 returns to a monitor mode for monitoring the host computer 1 as shown in Step 100. Incidentally, the image recording apparatus 4 (FIG. 2) outputs a visible image of the image data on papers of the output-request size by the output-request number, according to the output control data transferred, in Step 107.

When the output control unit 10 in the control device 3 decides that the value of the image data amount transferred from the host computer 11 is not within the range of the value indicative of the predetermined image data amount, in other words, it exceeds the value of the predetermined image data amount, it decides if the output-request number N of the output control data from the host computer 1 is equal to or more than 2, $N \geq 2$ (Step 109). If the decision result is not $N \geq 2$ (i.e., $N=1$), the processings of Steps 107 to 108 are executed. If the output control unit 10 decides in Step 109 that $N > 2$ holds, it reads out from the data memory unit 9, the output control data as the preset default values (the data of the output-request size and the output-request number), and modifies the output control data from the host computer 1 into the output control data as the preset default values (Step 110). The output control unit 10 then transfers the output control data as the preset default values to the image recording apparatus 4 (Step 111).

For the output control data as the preset default values of the type in which the image recording apparatus 4 selectively uses papers of different sizes, the output request size data is set to the data of the smallest size, and the output request number N data, to the data of $N=1$.

When the output control data as the preset default values is transferred to the image recording apparatus 4 (Step 111), the output control unit 10 reads out the image data from the image memory unit 8, and transfers it to the image recording apparatus 4 (Step 112). After completion of the sequence of the above processing steps, the control device 3 returns to a monitor mode for monitoring the host computer 1 as shown in Step 100.

Incidentally, the image recording apparatus 4 outputs a visible image of the image data on papers of the output-request size (e.g., the smallest size of paper) by the output-request number (one sheet) according to the output control data as the preset default values, in Step 110.

As seen from the foregoing description, the control device 3 is so arranged that when the output control data transferred from the host computer 1 is incorrect in connection with the amount of input image data, the output control data preset as default values (e.g., the data for outputting a visible image a sheet of paper of the smallest size) is transferred to the image recording apparatus. Therefore, there is successfully eliminated such an undesired situation that the image recording apparatus outputs an image (visible image) onto a number of papers of the incorrect output request size.

As described above, in a control method of an image recording apparatus, and a control device for carrying out the control method, which are according to the present invention, when it receives incorrect output control data in connection with an amount of input image data, the incorrect output control data is made invalid, and the output control data as is preset as a default value (e.g., the data for outputting a visible image a sheet of paper of the smallest size) is transferred to the image recording apparatus. The outputting control of the image recording apparatus is controlled on the basis of that output control data. Therefore, an operator will never encounter such an undesired situation that the image recording apparatus outputs an image (visible image) onto a number of papers of the incorrect output request size. Consequently, the problem of wasteful consumption of paper due to the incorrect output control data has successfully been solved.

Having described a specific embodiment of our bearing, it should be understood that the present invention may variously be changed and modified within the spirit and scope as set forth in the appended claims. It is further understood that the variations and modifications within the equivalents of the invention as defined in the claims are also within the spirit and scope of the invention.

What is claimed is:

1. A control method of a plotter for controlling outputting operation of the plotter according to inputted image data and inputted output control data with respect to an output-request size and an output-request number of paper, comprising the steps of:

reading out a range of values representing a predetermined amount of image data, which is uniquely defined for the inputted data with respect to the output-request size;

comparing the read out range of the values representing the predetermined amount of the image data with a value representing an amount of the inputted image data, and when the value representing the amount of the inputted image data exceeds the read out range of the values representing the predetermined amount of the image data, determining that the inputted output control data are incorrect; and when the inputted output control data are incorrect, transferring to the plotter, in place of the inputted output control data, an output control data preset as default values which controls to output an image on a sheet of a smallest paper usable for the plotter.

2. A control method of a plotter according to claim 1, wherein the plotter is an electrostatic plotter.

3. A control method of a plotter according to claim 1, wherein the plotter is a Xerography plotter.

4. A control device in use with a plotter for outputting to the plotter image data of raster image data, the image data being generated by a computer as image data of vector data and converted to the image data of the raster image data by a data converting unit, the control device comprising:

input control means for controlling a destination of the image data converted by the data converting unit which is contained in data transferred from the computer, and a destination of output control data with respect to an output request size and an output request number of paper, which are transferred from the computer;

a counter for receiving the image data from the input control means and counting a value representing an amount of the image data transferred from the input control means;

image memory means for temporarily storing the image data transferred from the input control means via the counter;

data memory means for storing a range of values representing a predetermined amount of image data as uniquely determined for the output-request size, and storing output control data preset as the fault values which control to output an image on a sheet of a smallest size usable for the plotter; and an output control means for controlling reading out of the range of the values representing the predetermined amount of the image data as uniquely determined for the output-request size from the data memory means according to the output control data with respect to the output-request size transferred from the input control means, comparing the value representing the amount of the image data counted by the counter with the range of the values representing the predetermined amount of the image data as uniquely determined for the data with respect to the output-request size readout from the data memory means, when the value representing the amount of the image data counted by the counter falls within the range of the values representing the predetermined amount of the image data as uniquely determined for the output-request size readout from the data memory means, transferring the output control data transferred from the computer to the plotter, thereafter transferring the image data stored in the image memory means from the image data memory means to the plotter, and when the value representing the amount of the image data counted by the counter exceeds the range of the values representing the predetermined amount of the image data as uniquely determined for the output-request size, transferring the output control data preset as the fault values in the data memory means, which control two output images on a sheet of a smallest size usable for the plotter, and thereafter transferring the image data stored in the image memory means from the image memory means to the plotter.

5. A control device in use with a plotter according to claim 4, wherein the plotter is an electrostatic plotter.

6. A control device in use with a plotter according to claim 4, wherein the plotter is a Xerography plotter.

* * * * *